United States Patent [19]
Heckler, Jr.

[11] 3,936,883
[45] Feb. 3, 1976

[54] MAGNETIC BUBBLE READ/WRITE HEAD

[75] Inventor: Clarence Herbert Heckler, Jr., Palo Alto, Calif.

[73] Assignee: Ampex Corporation, Redwood City, Calif.

[22] Filed: Dec. 27, 1974

[21] Appl. No.: 527,691

[52] U.S. Cl............. 360/110; 360/123; 340/174 TF; 340/174 SR
[51] Int. Cl.²...................... G11B 5/12; B11C 11/14; G11C 19/00
[58] Field of Search..................... 360/110, 112–113, 360/123, 125; 340/174 TF, 174 SR, 174 EB

[56] References Cited
UNITED STATES PATENTS

| | | | |
|---|---|---|---|
| 3,540,021 | 11/1970 | Bobeck et al. | 340/174 SR |
| 3,609,720 | 9/1971 | Strauss | 340/174 SR |
| 3,689,901 | 9/1972 | Bobeck | 340/174 EB |
| 3,716,781 | 2/1973 | Almasi et al. | 360/113 |
| 3,792,451 | 2/1974 | Almasi et al. | 340/174 SR |
| 3,793,639 | 2/1974 | Enz et al. | 360/110 |
| 3,842,407 | 10/1974 | Argyle et al. | 340/174 TF |

*Primary Examiner*—Alfred H. Eddleman

[57] ABSTRACT

Magnetic bubbles are employed to write and read digitized signals of audio, video and digital data in a magnetic medium, while circumventing the problems associated with high linear tape speed or rotary head motion. Writing is accomplished via the interaction of the bubble stray field within the write head and the magnetic medium, wherein the bubble is expanded to a select geometry within the head to provide a correspondingly higher stray field at the medium surface as required for writing therein. The bubble size prior to expanding does not generate sufficient stray field to write on the medium. Reading is accomplished via the interaction of the stray field from the magnetic history in the medium and the magnetic bubbles in the read head, utilizing an intermediate overlay pattern of high permeability material such as permalloy. In reading, the stray fields from the medium alter the positions of the bubbles in the read head, whereupon the detection of the displaced bubbles provides readout of the medium history. In both the writing and reading processes, the interaction between the medium and the bubble heads is limited to specific areas whereby adjacent bubbles in the head material neither interact with, nor are influenced by, the magnetic medium until the selected conditions are realized.

32 Claims, 19 Drawing Figures

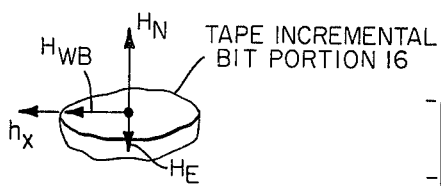
FIG_1A
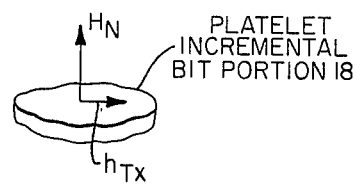
FIG_1B
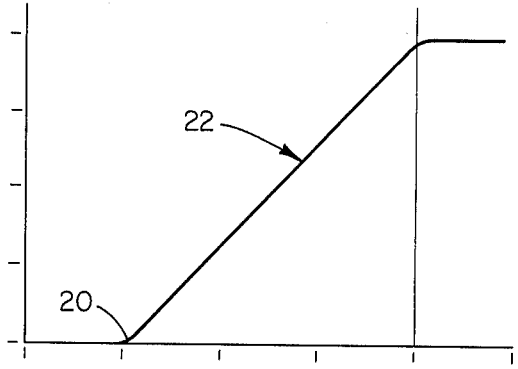
FIG_2
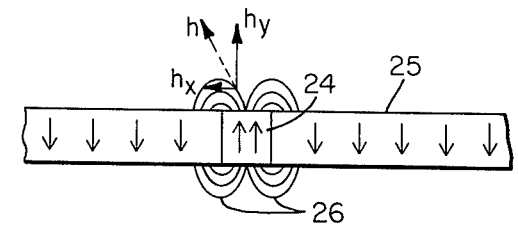
FIG_3A
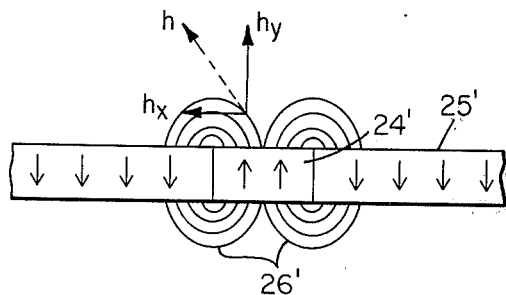
FIG_3B
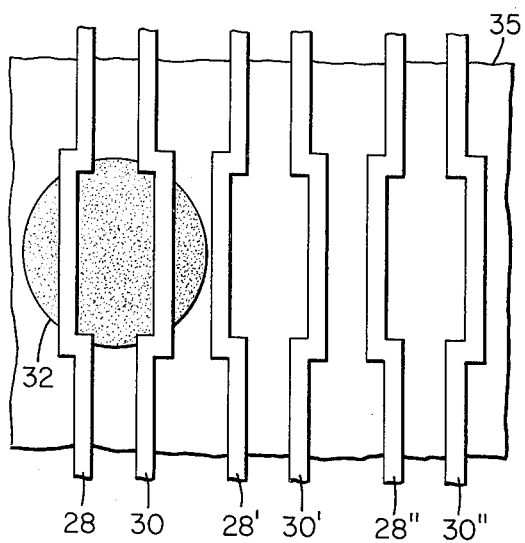
FIG_4
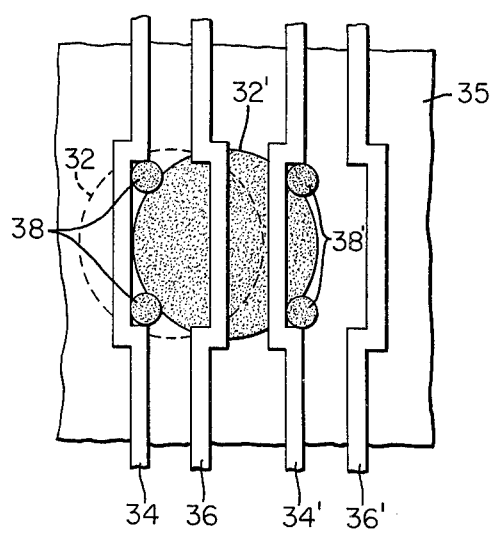
FIG_5

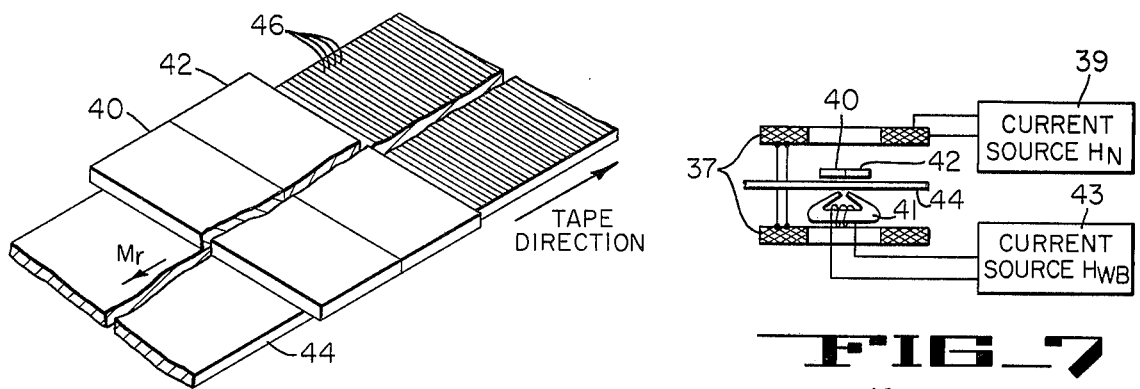
FIG_6
FIG_7
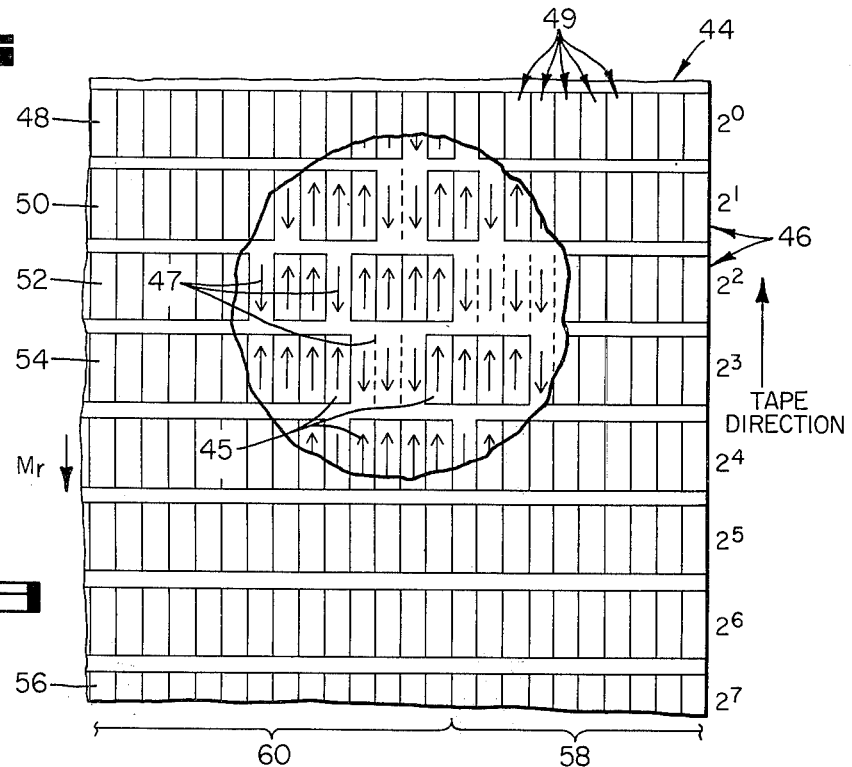
FIG_8
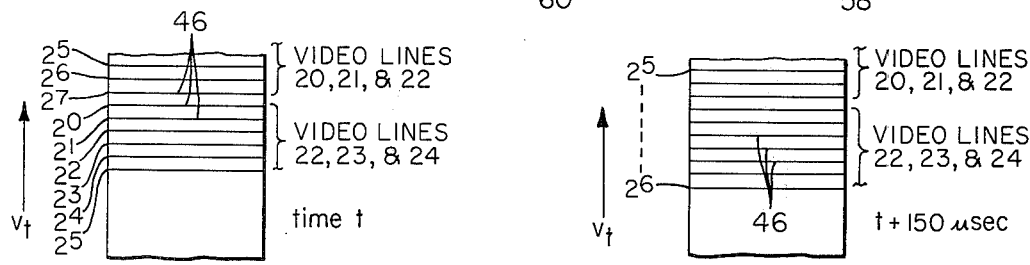
FIG_9A
FIG_9B
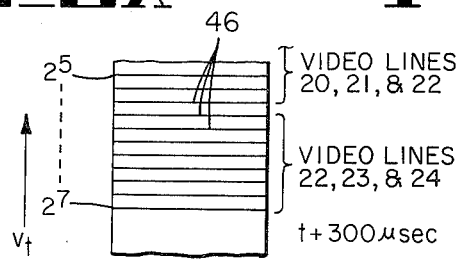
FIG_9C

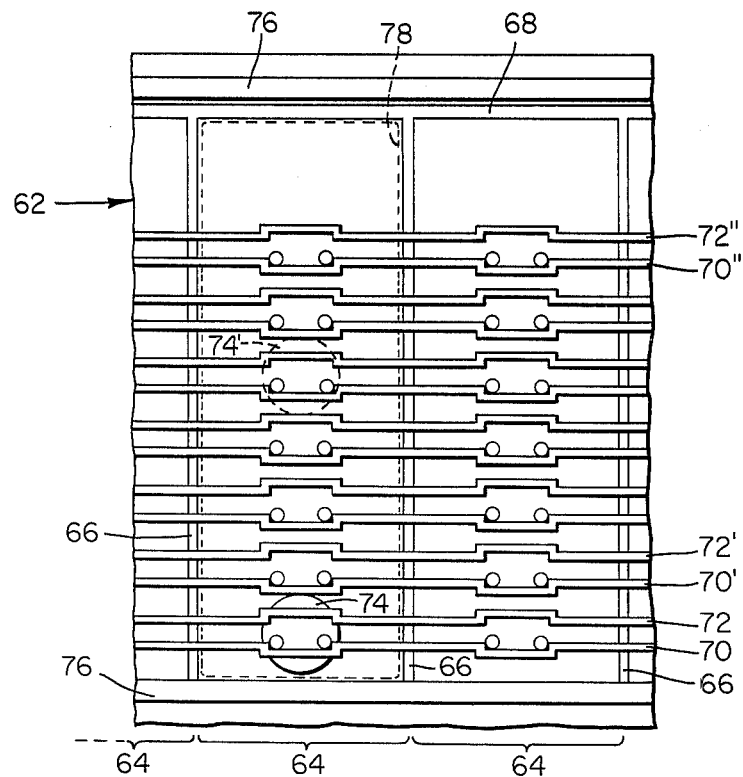
FIG_10
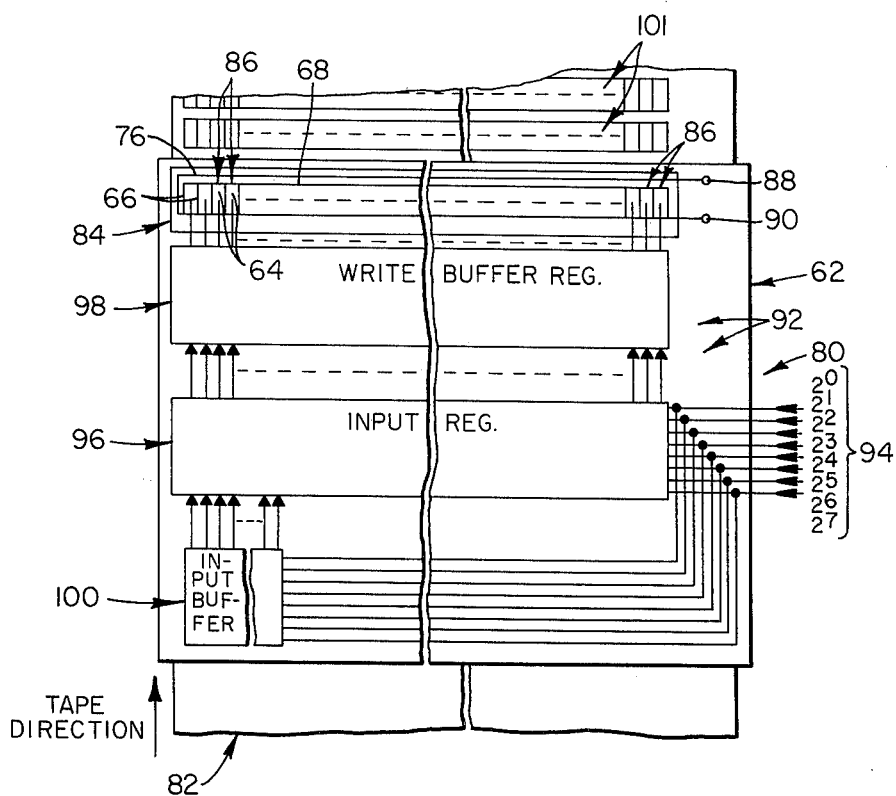
FIG_11

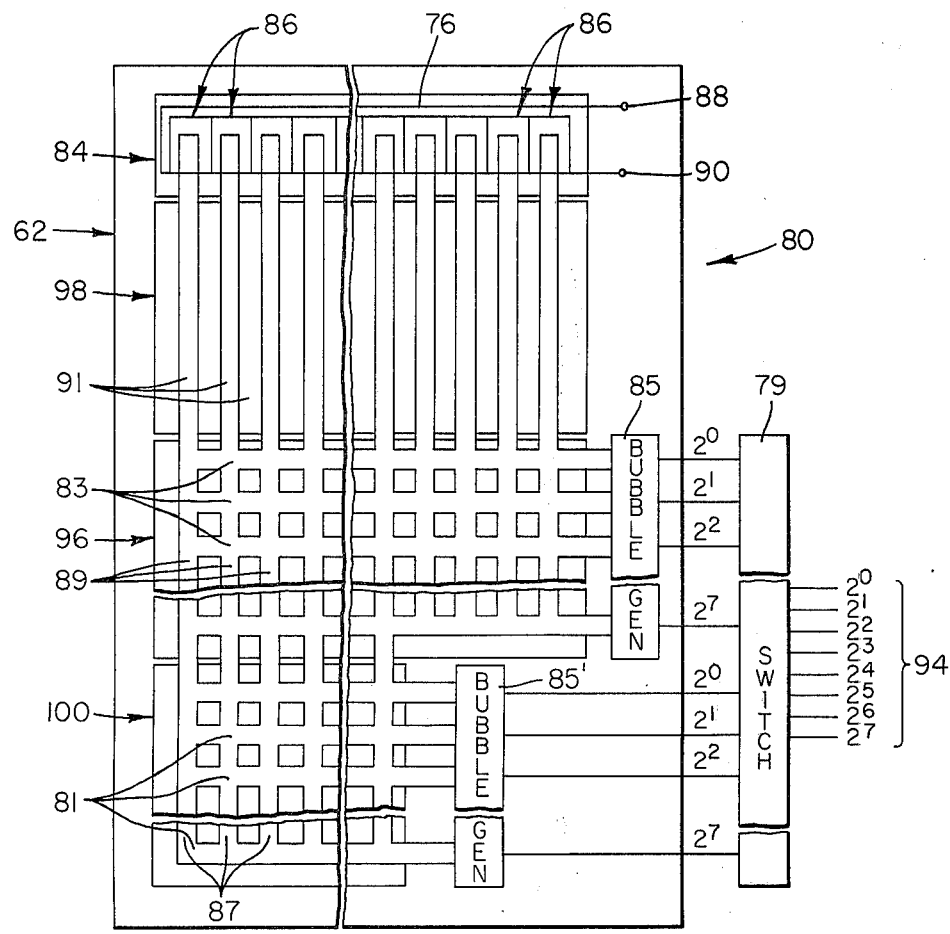
FIG_12
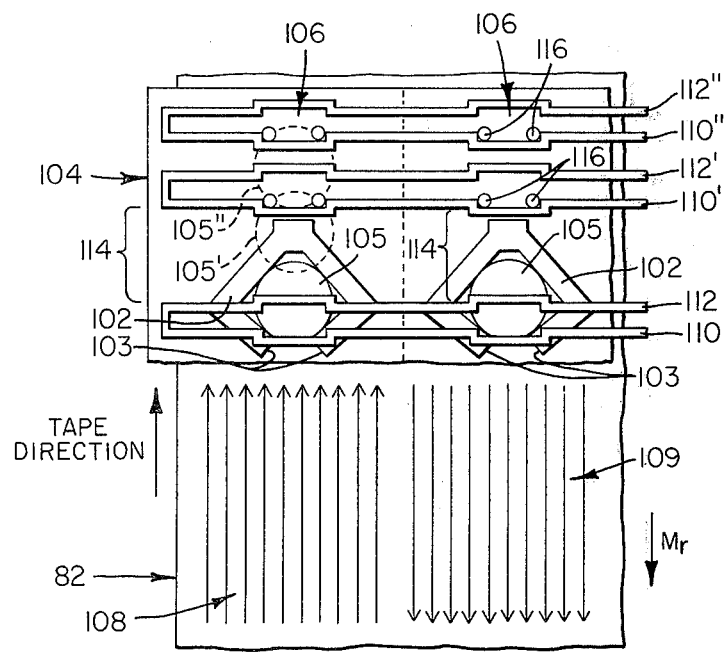
FIG_13

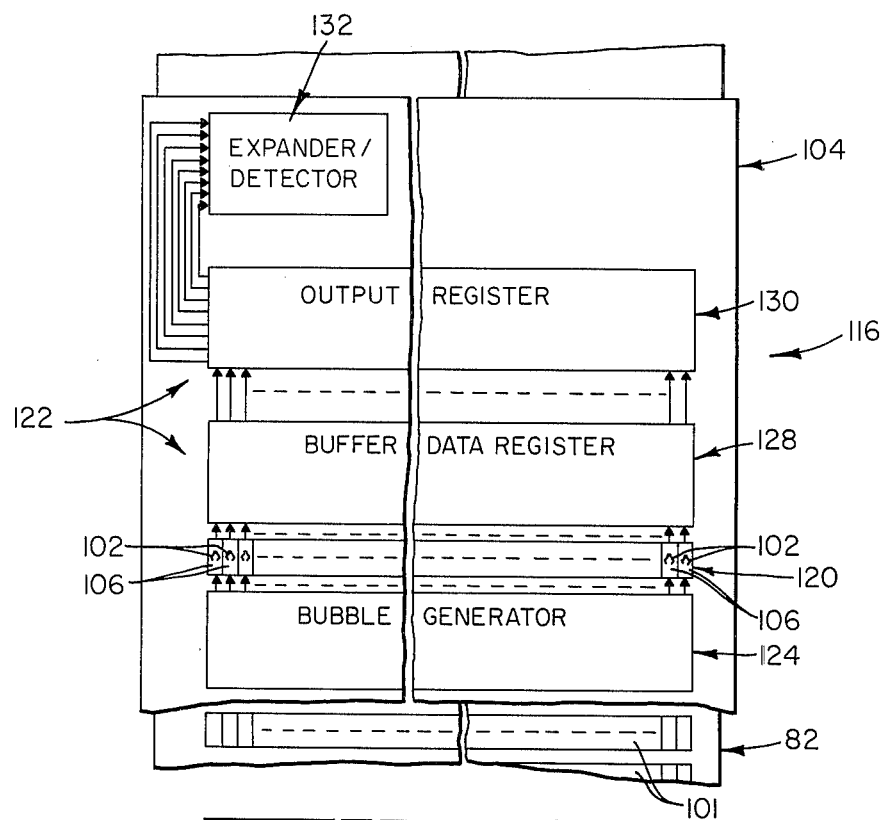
FIG_14
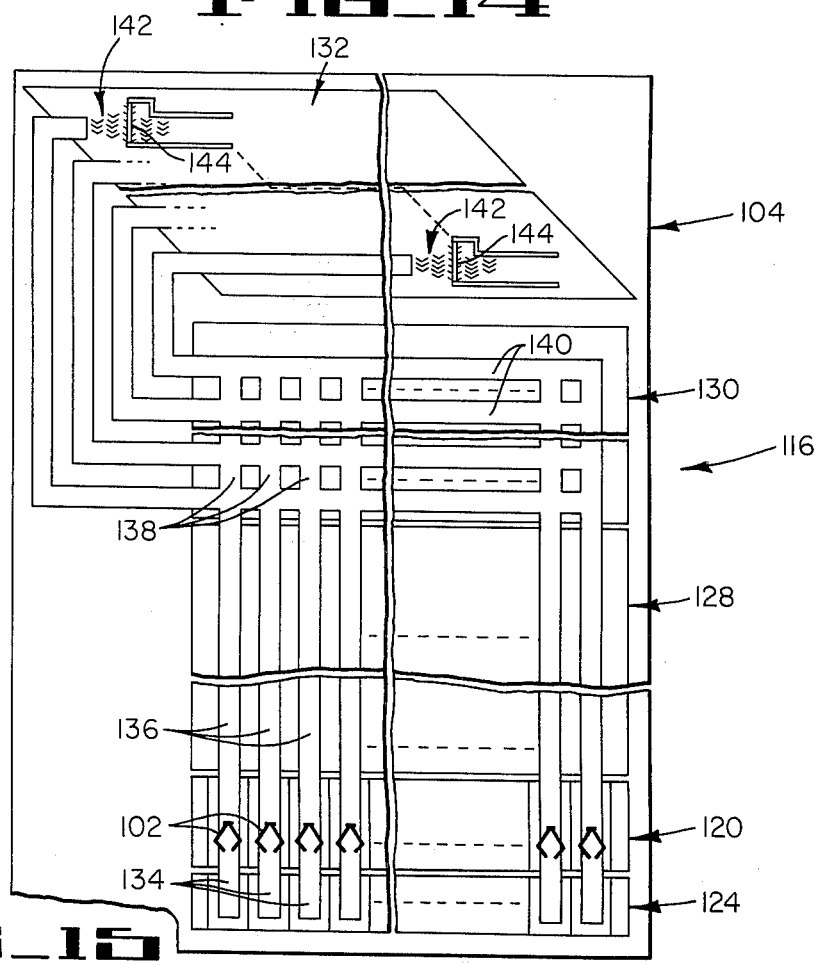
FIG_15

MAGNETIC BUBBLE READ/WRITE HEAD

BACKGROUND OF THE INVENTION

1. Field

The invention relates to an improved head capable of writing and reading audio, video and digital data onto and from a magnetic medium, and particularly to write/read heads utilizing the single wall domain (bubble) concept to perform wideband recording and playback of signals without requiring mechanical movement or high head-to-tape speeds, and with no limitation on the signal-to-noise ratio by the recording process.

2. Prior Art

The recording and readout of wideband signals requires a write/read system which has very high head-to-tape speed and includes systems with mechanical motion. Such prior art systems include rotary head recording, longitudinal tape recording, and straight high speed or direct video recording, wherein head-to-tape velocities lie in the range of 1000 to 2000 inches per second (ips). All these systems require contact between the recording medium and the head, which causes problems of medium and head wear due to high impact of the head against the tape. In addition, such systems have various mechanical and electronic problems associated with the medium transports, particularly in the area of speed servoing of not only the tape, but also the heads, as in the rotary head type of video recording system.

Such mechanical prior art video recording systems are also closely approaching the maximum densities possible by present state-of-the-art magnetic head techniques and materials, while advances in recording densities are possible with regards to the state-of-the-art of present and future magnetic recording mediums. Thus, present prior art video recording systems will not be able to take advantage of the improved density capabilities expected from future magnetic recording mediums.

Bubble write heads utilizing stray fields generated by a bubble in a bubble material are shown, for example, in U.S. Pat. Nos. 3,793,639 to U.E. Enz et al and 3,739,640 to J.A. Potgiesser. Such devices show that the stray field from a bubble can be used to record analog or digital information on a magnetizable medium. Such recording can be accomplished either with or without the aid of a magnetic bias field, dependent upon the strength of the stray field obtainable from the bubble. Prior art devices typified by the above patents suffer from several limitations. For example, the recording process is continuous, i.e., the stray field from a bubble continuously writes on the magnetic medium to define an uninterrupted track of reversed magnetization. Therefore, to record information, either the size or the location of the magnetized track must be varied. This prevents use of logic and control bubble circuits within the device, since the bubbles in these circuits would also write tracks on the magnetic medium thereby distorting and/or destroying the tracks containing the desired information. The requirement to vary the width or the location of a track in order to record information increases the effective width of each track and thus reduces the track density. Further, these devices are write heads only and are not capable of reading the recorded information.

SUMMARY OF THE INVENTION

The invention provides a method and apparatus for overcoming the shortcomings of the prior art whereby the writing and reading processes are confined to specific locations on the bubble platelets, thereby permitting bubble logic circuits to be incorporated in the system to perform useful logic and control functions. The invention combination further performs discontinuous writing to perform the record process, which minimizes the track width to maximize the track density. It follows that the recording density is limited only by the bubble-to-bubble interaction distance, generally of the order of four bubble diameters.

To this end, write and read bubble heads utilize platelets of bubble material such as, for example, a magnetic garnet, wherein bubbles generated therein interact with a magnetic recording medium to accomplish wideband writing and reading processes therewith. Interaction between the recording medium and the bubbles in the platelets is limited to specific areas to thus preclude interaction between the magnetic history in the medium and other bubbles in adjacent locations within the platelets. This condition is accomplished by providing the write process only when a bubble in the write platelet is expanded to a size which generates a selectively large stray field to write on the medium. The read process only occurs when the stray fields from the recording medium are sufficient to influence and thus displace the position of bubbles within the read platelet.

To this end, the write head platelet includes an "expander" device disposed within an in-plane write bias field, and a normal bias field, wherein a bubble is propagated into the expander and is expanded to a predetermined size and shape by applying current to a surrounding write conductor. The applied current is in a direction which reduces the normal bias field, to allow the bubble to expand. A plurality of expanders are disposed side by side within the platelet to provide a multi-channel write head. Writing is actually accomplished via the reaction between the expanded bubble and the magnetic medium.

The read head platelet includes a plurality of overlay patterns of selected shape, formed of a magnetic material of high permeability, e.g., permalloy. The patterns are used to effect the control of bubbles located within the patterns. The bubbles are held under respective overlay patterns until the stray field from a recorded bit, i.e., the magnetic history in the medium, induces poles in the patterns to propagate the respective bubbles to a new position in a direction along the initial direction of propagation of the bubbles. Detection of the displaced bubbles and generation of an electrical signal is made to recover the original magnetic history.

BRIEF DESCRIPTION OF THE DRAWINGS

FIGS. 1A, 1B are perspective views of an incremental bit portion 16 of a recording medium, and an incremental bit portion 18 of a platelet material, respectively; the former depicting the fields of concern during the record process, and the latter those of concern during the readout process.

FIG. 2 is a graph depicting the idealized magnetization hysteresis loop for a $Fe_2O_3$ magnetic recording medium with the subject heads.

FIGS. 3A, 3B are cross-sections depicting the bubble stray fields generated in garnet platelets by bubbles of different diameters.

FIGS. 4, 5 are partial plans exemplifying 3-phase and 2-phase current access circuits respectively, which may be used to propagate bubbles in the bubble platelets.

FIG. 6 is a perspective of a combined write/read head disposed adjacent a magnetic medium.

FIG. 7 is an elevation depicting means for generating some of the fields of FIGS. 1A, 1B.

FIG. 8 is a plan depicting a recording format generated in a magnetic medium via the invention.

FIGS. 9A, 9B, 9C are plans illustrating the consecutive line recording process in a magnetic medium.

FIG. 10 is an enlarged plan of an expander means for propagating and expanding a bubble within the write platelet.

FIG. 11 is a block diagram depicting a multi-channel write head formed in a bubble write platelet.

FIG. 12 is a representation of the block diagram of FIG. 11 showing the bubble paths.

FIG. 13 is an enlarged plan of a read overlay pattern for propagating bubbles through the read platelet in response to the magnetic history in the medium.

FIG. 14 is a block diagram depicting a multi-channel read head formed in a bubble read platelet.

FIG. 15 is a representation of the block diagram of FIG. 14.

DESCRIPTION OF THE PREFERRED EMBODIMENTS

There are generally five fields involved in the operation of the invention bubble head. Referring to FIGS. 1A and 1B first, a normal bias field $H_N$ is the field which is applied to the (write and read) magnetic garnet platelets, normal to their surface and in a direction opposite to the direction of magnetization within the platelets. This field biases the platelet to a condition which stably supports single wall, circular domains, or bubbles. Second, a bubble stray field $h_x$ is the field produced by magnetization within the bubble which is antiparallel to the magnetization in the major remaining portion of the magnetic garnet platelet. Third, a write bias field $H_{WB}$ is the field which is selectively applied during the actual write process, in the plane of the magnetizable recording medium in a direction opposite to the direction of magnetization in the unrecorded tape. This field biases the tape to just below the knee of the saturation magnetization curve. Thus the stray field $h_x$ from the bubble, when added to the write bias field, generates a composite write field to produce an irreversible magnetization change in the magnetizable recording medium. Fourth, a bit stray (or fringing) field $h_{Tx}$ is the field produced by the localized magnetized areas in the magnetic recording tape or medium which represents the recorded information. Fifth, a bubble expansion field $H_E$ is the field which is applied by a conductor during the actual write process in opposition to the normal bias field $H_N$, to allow expansion of the bubble to a size which generates a sufficiently large bubble stray field $h_x$ to provide the write process via the composite write field.

In performing the write process of the invention combination, a generally conventional magnetic medium such as tape, disc, drum, etc., is initially saturated by separate, generally conventional means in one direction. The medium is then biased by the write bias field in the opposite direction, to a point below the knee 20 of the saturation curve 22, FIG. 2. To perform the write process, a bubble write platelet is disposed in close proximity to the medium, whereby the sum of the stray field from an expanded bubble selectively disposed in the platelet, and the write bias field generates a composite write field which is in excess of the knee of the saturation curve 22. This composite write field performs the write function by reorienting the initial magnetization of the medium to record information in the form of permanently disturbed remnant states, which can then be detected during a subsequent readout process. If the write bias field is removed, the magnetization in the medium produced by the composite write field will remain in the remnant state, and there will be no further writing by the head. As the medium is moved past the write platelet of a multichannel head, successive bubbles are generated in the write platelet to thus record consecutive lines of bits across the medium.

FIG. 3A depicts pictorially a small bubble 24 of, for example, a diameter on the order of 6 microns or less, as generated in a platelet 25 of magnetic garnet material. The bubble 24 generates the stray field depicted by lines 26. The vectors $h_x$ and $h_y$ depict the horizontal and vertical components respectively of the bubble field. The horizontal component $h_x$ is utilized to supplement the write bias field to provide writing in the magnetic medium. For a "small" bubble the net $h_x$ field is increased only a small amount.

As illustrated in FIG. 3B, the stray field 26' from a large bubble 24' is greater than the stray field from a small bubble, whereby the horizontal component of the stray field $h_x$ is correspondingly larger than the component $h_x$ of the smaller bubble in FIG. 3A. This fact is utilized by the invention combination to perform the write function. That is, as further described hereinafter, the write process is performed by selectively expanding a small bubble such as that of FIG. 3A, to a larger bubble such as in FIG. 3B, preferably with selected geometry.

FIGS. 4 and 5 show respective portions of platelets depicting substantially conventional current access circuits in the form of pairs of conductors utilized to propagate a bubble 32 along preselected regions of a platelet material 35. FIG. 4 shows a 3-phase system wherein current access conductors 28, 30, 28', 30', etc., are sequentially pulsed via a 3-phase input. FIG. 5 shows a 2-phase system utilizing a pair of permalloy spots 38 in addition to pairs of current access conductors 34, 36. The spots 38 provide means for attracting the magnetic bubble 32 to the next set of conductors 34', 36', etc., at such time as the previous pair of conductors are successively de-energized. Current access circuits such as those of FIGS. 4 and 5 are conventional and are described, for example, in an article by A. H. Bobeck, et al, IEEE Transactions On Magnetics, Vol. 5, No. 3, September 1969, pp. 544–553.

FIG. 6 depicts by way of example a write/read head assembly 40/42 of the invention in position against a magnetic medium 44. The heads 40/42 may be utilized separately or may be actually bonded together to form an integral write/read head unit as depicted in FIG. 6. The integral head unit provides an advantage not available in conventional rotary head video recording techniques, in that it has the capability of reading information directly from the tape immediately upon writing. Thus the invention bubble head provides means for readily monitoring and verifying the signal actually recorded on the magnetic medium to allow immediate detection of dropouts, rather than having to detect the signal being fed to the recording head as in rotary head systems which do not allow immediate detection of dropouts. As portrayed, magnetic bits of information are written as lines 46 across the width of the magnetic medium 44 via the write head 40, and are immediately read from the medium via the read head 42. The only mechanical movement involved in the scanning process is the translation of the medium 44 past the integral head unit.

FIG. 7 illustrates by way of example only, means for applying the normal bias field $H_N$, and the write bias field $H_{WB}$, to the write/read head assembly 40/42 and magnetic medium 44. A Helmholtz coil assembly 37 fed by a current source 39 generates the uniform, normal bias field $H_N$, while a generally conventional head 41 generates the write bias field $H_{WB}$ along the plane of the medium 44 during the actual record process as provided via a pulsed current source 43. Such field producing apparatus is generally conventional and accordingly is not further described herein. Obviously, other field producing means may be employed in place of those shown.

FIG. 8 shows a portion of the magnetic medium 44 of FIG. 6 depicting in greater detail the format of lines 46 for storing information in the medium. In addition, individual "1" and "0" bits 45, 47 respectively, which define the digital information within lines 46, are exemplified in more detail with the "1" bits being defined by reversals in the initial state of magnetization $M_r$ of the magnetic medium 44. Thus a line 46 is formed of a plurality of juxtaposed bits extending across the width of the medium, wherein successive bits in succeeding lines form samples or words 49 which extend in a direction along the length of the magnetic medium 44. For example, when utilizing a 2-inch wide magnetic medium, 2000 channels, i.e., heads, are provided in the write/read head assembly (40/42 of FIG. 6) to thus simultaneously record (or read) the same bit of each word of the 2000 words extending across the width of the medium under the head assembly. In this example, 8 such lines 46 of bits 45, 47 are successively recorded down the length of the magnetic medium 44, to provide 2000 words 49 of 8 bits each.

By way of further illustration, line 48 of FIG. 8 is formed of 2000 bits of information, wherein each bit is the first or $2^0$ bit of the 2000 8-bit words 49. Line 50 includes 2000 bits of information corresponding to the second or $2^1$ bit of the 2000 8-bit words. Line 52 defines the third or $2^2$ bit of the 8-bit words, line 54 defines the fourth or $2^3$ bit of the 8-bit words, and so on along the length of the magnetic medium 44, until line 56 which defines the eighth or $2^7$ bit of the 2000 8-bit words. Thus it may be seen that 2000 longitudinally extending words of 8 bits each are recorded across the width of magnetic medium 44. The recording process continues with successive blocks of 2000 words of 8 bits each down the length of the medium 44.

The method of formatting determines the velocity of propagation required of the bubbles and hence determines the mobility of the magnetic garnet material. The required velocity is the quotient of the distance a bubble must propagate divided by the time necessary to propagate that distance. For a bit serial, word serial format a bubble must move 4 bubble diameters per bit per sample multiplied by 8 bits per sample for a distance of 32 bubble diameters in the time interval between samples. For a bit parallel, word serial format each bubble must propagate only 4 diameters during the intervals between samples, reducing by a factor of eight, the propagation velocity required for a bit parallel format under that required for a bit serial format.

With a 4 megaHertz video signal, a sample rate of 3 times the video information, and 63 microseconds as the length of a video line, there are 756 samples, or words, per video line. Thus in the exemplary format of FIGS. 8 and 9A-9C, there are approximately 2-½ lines of video information in each two-inch wide line (46) extending across the magnetic medium 44. Thus referring to FIG. 8, the words (of eight successive bits each) herein depicted by numeral 58 define the end portion of one video line of information, words 60 define the beginning portion of the next video line of information, etc.

FIGS. 9A, 9B, 9C depict successive recordings of lines 46 of information across the magnetic medium 44, wherein each line of information contains the similar bit of each word. Successive lines 46 across the medium 44 are recorded, for example, every 150 microseconds as indicated in the figures.

Referring to FIG. 10, there is shown in simplified enlargement a pair of juxtaposed bubble write heads of, for example, a multichannel write head assembly for recording multiple channels of information across a magnetic medium. The heads are formed within a platelet 62 formed of a bubble material such as a magnetic garnet. Each head configuration constitutes, and thus is defined by, "troughs" 64 which, in turn, are provided by an energy barrier in the form of permanently etched, bombarded, or otherwise formed, lines 66, 68 in the write platelet 62. The write platelet 62 is disposed adjacent a magnetic medium as depicted in FIG. 6. A large plurality of similar troughs 64 are disposed side-by-side to define the multi-channel write head assembly for simultaneously writing a line of bits across the width of a magnetic medium. Thus, in the example previously given, 2000 of the troughs may be juxtaposed to define a 2000 channel head assembly which is employed with a 2-inch magnetic tape for wideband video recording systems. By way of example only, such a video recording system may utilize the 2000 troughs spaced at 24 micron centers when utilizing bubbles of 6 microns diameter. With 4 or 2 micron bubble sizes, 16 or 8 micron centers respectively are used for the trough spacing.

The troughs 64 are herein provided by way of example by ion bombardment techniques, wherein the series of energy barrier lines 66 are formed with uniform spacings equal to the desired width of the troughs 64. The modification of garnets via ion bombardment is generally know, as discussed in "Modification of Magnetic Amisotrophy in Garnets By Ion Implantation," Applied Physics Letters, Vol. 19, No. 8, Oct. 15, 1971, pp. 298–299. The troughs are closed at one end via the continuous barrier line 68 extending the width of the multichannel head, i.e., essentially the width of the magnetic medium. Upon introduction of a bubble to the open end of selected troughs 64, as further described hereinafter, conductor means is provided for propagating the bubbles into the troughs prior to expanding same. To this end, current access conductors such as those described previously in FIGS. 4, 5 are disposed across the trough widths and extend the width of the bubble write platelet 62, i.e., across the multiple head assembly. In the exemplary head of FIG. 10, the 2-phase current access circuits of FIG. 5 are shown, whereby a bubble 74 introduced at the open end of the trough 64 is selectively propagated into the trough to a position shown by dashed bubble 74', via successive energizations of the conductor pairs 70–72.

A write current conductor (loop) 76 is disposed about the plurality of troughs 64, whereby application of a write current to the conductor generates a bubble expander magnetic field $H_E$ which opposes the normal bias field $H_N$. Accordingly, the normal bias field is decreased in value, which allows the bubble 74' to expand to an expanded bubble size and geometry (numeral 78) commensurate with the boundaries of the trough 64 determined by the energy barrier lines 66, 68 and write current conductor 76. Thus original bubble 74 assumes the relatively large size and the rectangular geometry of expanded bubble 78. The correspondingly large stray field $h_x$ generated by bubble 78 when combined with the write bias field provides a composite write field of sufficient value to reorient the initial state of magnetization of the recording medium adjacent thereto in the region of the trough 64 to define, for example, a "1" bit. Note that in a multi-channel head, a "1" bit is recorded by only those heads (i.e., troughs) into which a bubble 74 was initially introduced. Troughs (heads) in which no bubble was initially introduced would not be affected by the lowering of the normal bias field, since there is no bubble and thus no corresponding expansion thereof. Therefore, the initial state of magnetization of the magnetic recording medium in the areas in registration with the latter troughs would remain, to "record" in effect a "O" bit on the medium.

The rectangular shape of the troughs 64 provides an optimum in-plane component of the bubble stray field, $h_x$, along the direction of the write bias field. The dimensions of the rectangle are determined by the density of tracks required and the spacing between the head and the magnetic medium.

After recording the line of "1" and/or "O" bits, the write current is reversed in direction in the write current conductor (loop) 76, which reverses the direction of the magnetic field generated thereby and anihilates any bubble 78 within the plurality of troughs 64. The heads are thus prepared for the introduction of the next line of bubbles to selected troughs 64 thereof, in preparation for recording the next line of bits.

FIG. 11 depicts a block diagram of a multi-channel write head assembly 80 formed, for example, within the write platelet 62 of FIG. 10, the assembly being positioned to write on a magnetic medium 82. The assembly includes bubble expander means 84 formed of a selected plurality of troughs 64, determined by the energy barrier lines 66, 68 as previously described in FIG. 10. Each trough defines a separate write head 86. The write current conductor 76 extends about the entire juxtaposed array of troughs 64, whereby current applied to terminal 88 generates the expanded bubble or bubbles for writing purposes, and current applied to terminal 90 anihilates any bubbles in the heads 86.

The multi-channel write head assembly 80 further includes bubble logic circuits 92 for introducing bubbles via bubble generators 85, 85' (FIG. 12), to the individual heads 86 in accordance with the video, audio, etc., information applied to the assembly 80 via a plurality of input terminals 94. The information is fed in fit parallel, word serial format to input register means 96, which is coupled in parallel via bubble logic to write buffer register means 98. The latter means 98 selectively introduces bubbles to the individual heads 86 in accordance with the information input to terminals 94 as further described infra. Input buffer means 100 is also serially coupled to the terminals 94 and thence in parallel to the input register means 96. The logic components 85, 85', 96, 98, 100 are integrally formed within the garnet platelet 62, via conventional photolithography techniques.

In operation, information is serially introduced from an exterior electronic sampling circuit (not shown) to the input register means 96 in the form of 8-bit samples, or words, wherein one word is designated herein as bits $2^0, 2^1 \ldots 2^7$. Although 8-bit words are shown here, and in FIGS. 8, 9A-9C, the words may be formed of any selected plurality of bits. If the head assembly 80 employs 2000 heads 86 for recording on a 2 inch magnetic medium 82, the associated input register means 96 would contain 2000 8-bit words when filled. That is, means 96 provides a plurality of words equal to the number of channels recorded on the tape. Once the input register means 96 is filled, the information is shifted in parallel, as lines of bits, out of the input register means 96 into the write buffer register means 98 until the latter is filled. While additional information is being introduced from terminals 94 to re-fill the input register means 96, a single bit line 101 at a time is shifted from the write buffer register means 98 in the form of bubble logic, to the troughs 64 of heads 86. That is, "1" bits are introduced to the heads 86 as bubbles, while "O" bits are introduced by the absence of a bubble. The bubbles representing "1" bits are propagated into their respective troughs 64 via the current access circuits (70–72 of FIG. 10), whereupon recording is provided on the magnetic tape 82 by expanding the bubbles via energization of the write current conductor 76, as previously described in FIG. 10, to define recorded lines 101 (corresponding to lines 46 of FIGS. 6, 8, 9). The current is then reversed in conductor 76 to collapse the bubbles, whereupon a new line of bubbles are advanced into the troughs 64. When the write buffer register is empty, the next block of 2000 8-bit words being held in the input register means 96 is shifted into the former to re-fill same.

The input buffer means 100 provides means for temporarily storing information which is being sampled and introduced to the input terminal 94, at such time as the input register means 96 is full, as during the time intervals when the information is being shifted from the latter to the write buffer register means. The information temporarily stored in the input buffer means 100 is then shifted into the input register means 96 when there is room in the latter. Thus the buffer means 100 enables the continuous sampling and introduction of information to the write head assembly 80, while allowing intermittent shifting of information to the head troughs.

Referring to FIG. 12, the block diagram of FIG. 11 is shown in greater detail in the form of one and two dimensional bubble logic circuits. The video information is introduced as an 8-bit digital word via the input terminals 94 and an electronic switch 79 in the external sampling circuit of previous mention (not shown), along "horizontal" bubble paths 81 and 83 of the input buffer means 100 and the input register means 96, respectively. The information is introduced in the form of the presence and absence of bubbles representing "1" and "O" bits respectively. The bubbles are selectively generated by bubble generator means 85, 85' coupled to the switch 79. The bubbles which are generated are propagated into the buffer means 100 and register means 96 to "vertical" bubble paths 87 and 89, respectively. Horizontal and vertical propagation of the bubbles is provided via respective vertically and horizontally extending current access conductors (not shown) such as those depicted in FIGS. 4, 5 disposed within a plane superimposed against the garnet platelet 62, and energized via a conventional current source coupled to the conductors. Examples of the propagation circuits are described in the Bobeck et al article, supra.

It is to be understood, that field access circuits (not shown) may be employed in place of the current access circuits discussed supra, in various applications of the write head. To this end, two sets of Helmholtz coils may be disposed orthogonally to each other to provide a rotating field in the plane of the platelet 62. The coils are fed with a 90° out of phase sine wave current. Thus the input buffer means 100 and the input register means 96 comprise two dimensional propagation shift registers employing bubble logic networks. In the head example discussed above relative to FIGS. 6–10, 2000 of the vertical bubble paths 89 are disposed within the width of the input register means 96, providing accordingly 2000 channels or tracks of information across the width of the 2 inch medium.

The terms "horizontal" and "vertical" are herein intended to define directions transverse to, and parallel with, respectively, the direction of bubble movement into the troughs 64, i.e., the direction of movement of the magnetic medium 82.

The bubble paths 89 are coupled to vertical bubble paths 91 of the write buffer register means 98, whereby the latter component provides one dimensional shifting of the bubbles introduced thereto, vertically along the paths 91, and into the bubble expander means 84 and thus the bubble head assembly. Note there is no physical demarcation between the various registers, buffers, expander, etc. Thus, for example, the last horizontal current access conductors (not shown) of the buffer means 100 are disposed only a bubble "step" from the first horizontal current access conductors (not shown) of the register means 96, etc.

The input buffer 100 is of selected width determined by the logic system 92, i.e., only has to be large enough to handle the stream of data bits introduced thereto via terminals 94 during shutdown of data input to the input register means 96. Thus the input buffer allows the introduction of a continuous stream of information to the head assembly at all times, for example, during the time that the lines of information are being shifted from the input register means 96 to the write buffer register means 98.

FIG. 13 is an enlarged view of means for detecting a pair of channels of the magnetic field history previously recorded on a magnetic medium. To this end, an overlay read pattern 102 of selected geometry and of a high permeability material such as permalloy, is integrally formed with a read platelet 104 formed of a magnetic garnet similar to the write platelet 62 of FIGS. 10–12. Only a fragment of the read platelet, and a pair of juxtaposed patterns 102 are shown herein, wherein the patterns define respective reproduce heads 106 for readout of a single channel, or track, of magnetic history recorded on the magnetic recording medium 82 as by the record head 86 (trough 64) of FIGS. 10–12. The magnetic history is depicted herein as a single "1" bit of reversed magnetic field, indicated by numeral 108, previously recorded in one track of the magnetic medium 82, and a "0" bit represented by the initial state of magnetization in a second track of the medium indicated by numeral 109. The read pattern 102 is exemplified here with a four-sided geometry generally resembling a diamond shape, open at one end 103 with an inside dimension substantially equal to the diameter of a bubble 105. Various pattern geometries other than the diamond shape shown here are available which perform the desired function further described hereinafter, and accordingly, the read head is not limited to such configuration. A plurality of such read head patterns are juxtaposed to define a multi-channel reproduce head assembly of the same number of channels and of a width equal to, for example, the write head assembly 80 of FIG. 11.

The read heads 106 are further defined by a series of pairs of current access conductors (loops) 110–112, 110'–112', etc., extending laterally across the read heads the full width of the magnetic medium, and thus transverse to the direction of medium movement. The pairs of conductors 110–112, etc., are similar to those described in the write head of FIG. 10, wherein the first pairs of conductors have no permalloy spots and extend in register with the leading half of the read pattern 102 at the open end 103 thereof. The trailing half of the read pattern 102 is in register with a gap, or "gorge" 114, formed by omitting a pair of the current access conductors. Additional pairs of conductors 110'–112', 110"–112", etc., with permalloy spots 116, extend transversely across the heads in the region trailing the patterns 102, to receive the bubble from the gorge 114 for further propagation thereof to detector means, as described hereinafter.

In operation of the read heads of FIG. 13, bubbles 105 are introduced to the read patterns 102 in selected synchronization with the passage thereby of (the lines of) bits of information 108, 109 in the magnetic medium 82. The bubbles 105 are introduced to the heads via current access (loop) conductors such as indicated by numerals 110–112, to a location immediately in register with the inside dimensions of the read pattern 102. Continued energizing of the conductors 110'–112', 110"–112" in their normal sequence, in turn, will not cause the bubble to move across the gorge 114. This is because gorge 114 defines a gap in the conductor pattern underneath the trailing half of the read pattern 102. Thus the bubble 105 will remain within the read pattern 102 until a reversed bit of information (reversed magnetization 108) passes beneath the pattern. The stray field from the reversed magnetization induces magnetic poles in the pattern 102, which moves the bubble from its stable position within the pattern to an unstable position 105'. When the next (loop) conductors 110'–112' are energized, the bubble 105' is attracted to the position 105". Continued energizing of the successive conductors 110"–112", etc., cause the bubble to propagate into the next circuit for detection thereof as a "1" bit, as described infra in FIGS. 14, 15. As may be seen, if no reversed state of magnetization (108) passes under the bubble 105 within the pattern 102, the bubble cannot move across the gorge 114 and no bubble is delivered to the subsequent detection circuits. The lack of a bubble defines the "0" bit of information.

FIG. 14 depicts a block diagram of a multi-channel read head assembly 116 formed within the read platelet 104, the assembly being positioned to read the magnetic history of the magnetic tape 82. The assembly 116 includes read overlay pattern means 120 formed of a selected plurality of the read overlay patterns 102 previously described in FIG. 13. Each pattern 102 defines a separate read head 106 disposed to reproduce respective tracks of information previously recorded by an equal plurality and spacing of write heads 86 (FIG. 11).

The multi-channel read head assembly 116 further includes bubble logic circuits 122 for introducing bubbles to the read heads 106, and for detecting the information retrieved by the read overlay pattern means 120. To this end, bubble generator means 124 is disposed immediately adjacent the leading edges of the read heads 106, i.e., the open ends 103 (FIG. 13) of the read patterns 102. The bubble generting means 124 may comprise any of several devices, e.g., current loop, etc., capable of generating a single wall magnetic domain in a magnetic material. Bubbles are introduced to each of the patterns during the readout process of each line of information 101 (also FIG. 11) previously recorded transversely across the medium 82. The trailing edges of the read heads 106, i.e., the closed ends of the patterns 102, are operatively coupled in parallel relation via bubble logic and the current access conductors (not shown) to buffer data register means 128. The latter means is coupled in parallel via bubble logic to output register means 130, which in turn is serially coupled to expander/detector means 132. The logic components 124, 128, 130 and 132 are integrally formed within the garnet platelet 104, as in the write head assembly 80.

In operation, the read head assembly 116 employs a series of current access conductors for propagating a bubble to the gorge 114 (FIG. 13), whereupon the (permalloy) read pattern 102 disposed to span the gorge interacts with the stray field generated by the magnetic history in the recording medium 82. Poles are generated in the pattern 102 which attract and repel the bubbles to cause them to jump the gorge. Thus, as previously noted, the gorge 114 prevents the propagation and subsequent detection of a bubble unless there is reverse magnetic history in the tape in register with the gorge 114. If a reverse state of magnetization is present in the tape, the bubble is propagated to a detection point. It follows that the "1" bit (reverse magnetization) causes the detection of a bubble, while the "O" bit does not.

Bubbles which do jump the gorge 114 are propagated along respective bubble channels or paths into the buffer/data register means 128 via associated current access conductors (e.g.. 110–112, 110'–112', etc. of FIG. 13). If 8-bit words are being read from the medium 82, the buffer/data register means 128 is filled with 2000 words of 8 bits each, after 8 lines 101 are read and moved therein. The contents of the register means 128 are then simultaneously shifted in parallel into the output register means 130. In turn, the latter output register means is serially emptied into the expander/detector means 132, wherein the latter circuit thus receives successive 8-bit words in the form of the presence or absence of bubbles, expands any bubbles and detects the resulting expanded bubbles to thus distinguish the binary "1" and "O" bits. While the output register means 130 is shifting words into the expander/detector means 132, the buffer/data register means 128 is being re-filled from the read overlay pattern means 120. When the 8th bits of the next block of 2000 words are shifted into the buffer/data register 128, all the bits have been serially readout from the output register means 130, and the read process continues with the next block of 2000 words.

Referring to FIG. 15, the block diagram of FIG. 14 is shown in greater detail in the form of one and two dimensional bubble logic circuits of the type described in FIG. 12. Thus the generator 124 comprises a field access or current access type of bubble generator, which generates bubbles and then propagates same into each read pattern 102 of the read overlay pattern means 120 via vertical bubble paths 134. Bubbles which cross the gorge 114 during the readout process are propagated along verical bubble paths 136 which, inter alia, define the one-dimensional propagation buffer data register means 128. The bubbles are then introduced to respective vertical bubble paths 138 of the output register means 130. Thus, 2000 samples of 8 bits each are shifted in parallel into the means 130, wherein the presence and absence of bubbles respectively represents the "1" and "O" bits of information read from the magnetic medium 82.

When the two dimensional propagation output register 130 is full the bubbles are serially shifted therefrom along horizontal bubble paths 140 to the (one dimensional) expander/detector means 132. Detection of bubbles introduced thereto may be effected via a chevron expander pattern 142, wherein the bubbles are expanded and then detected via a magnetoresistive detector means 144 disposed along each chevron expander pattern. Obviously, other expander patterns and other types of detector configurations may be employed. Typical schemes for bubble propagation and detection are shown in "Bubble Domain Propagation and Sensing", G. S. Almasi, Proceedings IEEE, Vol. 61, No. 4, April, 1973. The bubble propagation circuits employed by the read head of FIGS. 14, 15 are the same as those discussed with reference to the FIGS. 11, 12.

The FIGS. 8, 9A-9C show a parallel mode of recording, i.e., recording words along the length (or direction of movement) of the magnetic medium, rather than across the width as in conventional recording systems. Such a recording format decreases markedly the demands placed on the speed of propagation of the bubbles within the platelet, and thus decreases the demands placed on the garnet materials used to fabricate the platelets. That is, one problem in using bubble logic is that the velocity of propagation of bubbles is limited and varies with the garnet material employed. In order to prevent interaction between bubbles, they should be spaced apart on the order of four bubble diameters. It follows that the frequency of propagation of the bubbles is a function of the length of time it takes to move them four bubble diameters. Thus, regardless of the garnet material used, the bandpass frequency capability is limited by the maximum velocity of bubble propagation. Accordingly, the invention combination contemplates the parallel mode of recording shown in FIGS. 8, 9A-9C in order to minimize the demands on bubble velocity and garnet materials.

By way of example, Table I included infra provides a comparison of various operating parameters and characteristics when employing bubble sizes equal to 6, 4, 2 and 1 micrometers ($\mu$m) at 2 and 4 megaHertz bandpass frequencies of video information. Table II provides analogous information for audio record/reproduce processes. The charts show, for example, the bubble velocity required for various bubble sizes and various frequencies of recorded information. Thus, when using a 6 micron bubble diameter with a 2 megaHertz bandpass, a bubble velocity of 2400 centimeters per second is required. At four megaHertz bandpass, a 4800 centimeter per second velocity is required, which places more stringent demands on the garnet material used, i.e., limits use to only garnets with relatively high bubble velocities. On the other hand, the use of smaller bubbles decreases the distance of required travel therefore decreasing the bubble velocity requirements of the garnet material, while greatly improving the recording densities of the system.

TABLE I

BUBBLE VIDEO RECORDING

| Bubble Diameter (d) μm | Frequency (f) MHz | Bubble Velocity ($v_b$) cm/sec | Tape Width ($W_t$) in | Skew (μm) | Tape Speed ($v_t$) ips | Output ($D_R$) $10^6$B/in$^2$ |
|---|---|---|---|---|---|---|
| 6 | 2 | 2400 | 2 | 6 | 27 | 1.0 |
| " | " | " | 1 | 3 | 48 | " |
| " | " | " | ½ | 1½ | 91 | " |
| " | " | " | ¼ | ¾ | 178 | " |
| " | 4 | 4800 | 2 | 6 | 54 | " |
| " | " | " | 1 | 3 | 100 | " |
| " | " | " | ½ | 1½ | 190 | " |
| " | " | " | ¼ | ¾ | 370 | " |
| 4 | 2 | 1600 | 2 | 6 | 13 | 2.5 |
| " | " | " | 1 | 3 | 23 | " |
| " | " | " | ½ | 1½ | 42 | " |
| " | " | " | ¼ | ¾ | 80 | " |
| " | 4 | 3200 | 2 | 6 | 26 | " |
| " | " | " | 1 | 3 | 45 | " |
| " | " | " | ½ | 1½ | 86 | " |
| " | " | " | ¼ | ¾ | 160 | " |
| 2 | 2 | 800 | 2 | 6 | 4¼ | 9 |
| " | " | " | " | 3 | 6¾ | " |
| " | " | " | ½ | 1½ | 11½ | " |
| " | " | " | ¼ | ¾ | 21 | " |
| " | 4 | 1600 | 2 | 6 | 8½ | " |
| " | " | " | 1 | 3 | 13¼ | " |
| " | " | " | ½ | 1½ | 22¾ | " |
| " | " | " | ¼ | ¾ | 42 | " |
| 1 | 2 | 400 | 2 | 6 | 1½ | 36 |
| " | " | " | 1 | 3 | 2¼ | " |
| " | " | " | ½ | 1½ | 3½ | " |
| " | " | " | ¼ | ¾ | 5¾ | " |
| " | 4 | 800 | 2 | 6 | 3 | " |
| " | " | " | 1 | 3 | 4¼ | " |
| " | " | " | ½ | 1½ | 6¾ | " |
| " | " | " | ¼ | ¾ | 11½ | " |

TABLE II

BUBBLE AUDIO RECORDING

| d μm | f KHz | b cm/sec | Wt in | Skew μm | Bits | Signal/Noise S/N db | t ips |
|---|---|---|---|---|---|---|---|
| 6 | 20 | 288 | ¼ | ¾ | 8 | 48 | 1.8 |
| " | " | " | " | " | 11 | 66 | 2.1 |
| " | " | " | " | " | 14 | 84 | 3.1 |
| " | " | " | " | " | 17 | 102 | 3.8 |

The invention combination of FIGS. 11 and 14 are examples of one embodiment, wherein continuous bubble logic is employed across the width of the registers, buffers, etc., during the record and reproduce processes. As may be seen, the write/read platelets of such a system would require garnet materials of high bubble velocity parameters since the bubbles have to be propagated across the entire width thereof.

In an alternative embodiment of the invention combination, the input register means 96 and write buffer register means 98 may be subdivided into a number of smaller bubble logic units, whereby the serially incoming information from input terminals 94 would not necessarily be sequentially located across the width of the register and buffer means. Thus such a system provides in effect a commutation scheme wherein, for example, the register means 96 may be subdivided into five logic units. Incoming samples would therefore only have to be propagated one fifth of the width of the register means, thereby decreasing the total time it takes to fill the register means, buffer register means, etc. Thus the latter combination operates at lower bubble velocities thereby allowing use of presently readily available garnet materials of lower bubble speeds, or the use of higher speed garnet materials to provide a relatively high speed, high intensity record/reproduce bubble head for high bandwidth video recording processes.

I claim:

1. A bubble write head for recording information in a magnetic medium, and including a normal bias field for biasing the head to a condition which stably supports the generation and storage of single wall domains, the head comprising; write bubble platelet means disposed in recording position relative to the recording medium for selectively generating single wall magnetic domains commensurate with the information being recorded, which domains generate stray fields which are insufficient to cause interaction with the magnetic medium;

said bubble platelet means including integral bubble expander means for expanding the existing insufficient domains to a size sufficient to apply a write magnetic field to the medium only upon expansion of the domains, thereby to perform the write process.

2. The write head of claim 1 wherein the bubble expander means includes write bias field generating means for biasing the magnetic medium to a point on its associated saturation magnetization curve, such that the composite expanded domain stray field and the write bias field are sufficient to perform the write process on the magnetic medium.

3. The write head of claim 2 wherein the bubble expander means includes an expansion field applied in opposition to the normal bias field to allow bubble expansion in response thereto, said write magnetic field defining first binary bits in the magnetic medium, wherein the absence of domains defines the second binary bits of the write process.

4. The write head of claim 3 wherein the bubble expander means further includes means for anihilating the expanded bubbles after the write process is performed.

5. The write head of claim 3 wherein the single wall magnetic domains define magnetic bubbles, and the write bubble platelet means further includes write bubble logic circuits integrally formed therein for receiving the information to be recorded and for generating the bubbles in accordance with said information, said bubble expander means being integrally formed with the bubble logic circuits to define the bubble write head.

6. The write head of claim 5 wherein the write bubble logic circuits further comprise;

a bubble generator coupled to receive the information and to generate bubbles in accordance therewith;

input register means coupled to the bubble generator;

write buffer register means coupled to the input register means and thence to the bubble expander means; and input buffer means coupled to the bubble generator and adapted to selectively receive and store the information when the input register means does not, and to subsequently introduce the information to the input register means.

7. The write head of claim 6 further comprising, current access circuits integral with the write bubble logic circuits and the bubble expander means to selectively propagate the bubbles through the logic circuits and into the bubble expander means for expansion thereof to perform the write process.

8. The write head of claim 5 wherein the information to be recorded is introduced to the write head in bit parallel, word serial format, wherein the write bubble logic selectively accumulates the bits to allow their serial introduction from the integral bubble expander means to the magnetic medium to record the words in side-by-side format across the width of the medium.

9. The write head of claim 2 wherein the signal wall magnetic domains define magnetic bubbles, and the bubble platelet means is formed of a bubble material;
wherein the expander means further includes;
a trough defining a bubble write head formed within the platelet means, said trough having a selected geometry defined by boundaries in the form of energy barriers;
said write bias field generating means being disposed to bias the magnetic medium over a region thereof which is in register with the trough;
wherein said trough defines the size and geometry of the expanded bubble upon energization of the write bias field generating means; and
current access circuits disposed across the trough to propagate the bubble therealong in response to selective energization of the current access circuits.

10. The write head of claim 9 wherein a plurality of troughs and thus write heads are juxtaposed to define a multi-head write assembly, said write bias field generating means being disposed to bias the magnetic medium over a region thereof in register with the multi-head assembly, said current access circuits extending through all the juxtaposed troughs to simultaneously propagate therein those bubles which are generated to represent a reversed state of magnetization.

11. A bubble read head for reproducing the magnetic history recorded in a magnetic medium in the form of reversed and non-reversed states of magnetization, comprising;
read bubble platelet means disposed in reproducing position relative to the magnetic medium for generating single wall magnetic domains with stray fields insufficient to affect the states of magnetization in the medium;
the read bubble platelet means including integral means for restraining movement of a domain when nonresponsive to the magnetic history in the medium, and for selectively displacing the position of the domain when responsive to the magnetic history; and
detector means integral with the read bubble platelet means for detecting the displaced domains to thus determine the magnetic history in the medium.

12. The read head of claim 11 wherein the integral means for restraining movement of a single wall domain includes, overlay pattern means disposed to restrain the domain therein until influenced by passage thereby of a reversed state of magnetization of the recorded magnetic history in the medium.

13. The read head of claim 12 wherein the integral means for restraining movement of a domain further includes propagating means integral therewith to selectively propagate the domains, wherein said overlay pattern means is disposed to span a gorge formed by omission of selected portions of the propagating means, said gorge preventing movement of the domain until influenced by passage of the reversed state of magnetization.

14. The read head of claim 13 wherein the single wall magnetic domains define magnetic bubbles, and the read bubble platelet means further includes read bubble logic circuits integrally formed therein for generating bubbles for introduction to the overlay pattern means, and for receiving from the latter means any bubbles displaced from their position in the overlay pattern means for subsequent detection thereof via the detector means.

15. The read head of claim 14 wherein the magnetic history is recorded in the medium as a multiplicity of words disposed in side-by-side format across the width of the medium, wherein the overlay pattern means receive respective words of the multiplicity of words in the form of serial successions of bits, wherein the read bubble logic selectively accumulates the bits to allow a bit parallel, word serial introduction thereof to the detector means to retrieve the magnetic history.

16. The head of claim 14 wherein the read bubble logic circuits further comprise;
a bubble generator coupled to the overlay pattern means to selectively introduce bubbles thereto;
buffer data register means coupled to the overlay pattern means to receive any displaced bubbles;
output register means coupled to the buffer data register means and thence to the detector means to selectively advance information to the buffer data register means for subsequent detection.

17. The head of claim 16 further comprising, current access circuits integral with the read bubble logic circuits to selectively propagate the bubbles into, and from, the overlay pattern means in accordance with the magnetic history in the medium.

18. The head of claim 17 wherein the bubble platelet means is formed of a bubble material;
wherein the overlay pattern means includes a diamond shaped read pattern formed of a high permeability (magnetic) material and defining a read head;
wherein the leading half of the read pattern is formed of an open corner of the diamond shape;
wherein the trailing half of the read pattern is disposed to span the gorge; and
wherein passage adjacent the read pattern by the stray magnetic field of a reversed state of magnetization of the magnetic history induces magnetic poles in the pattern to displace the bubble from within the pattern region to a point beyond the gorge.

19. the head of claim 18 wherein the bubble is displaced in a straight line direction along the direction of travel of the magnetic medium.

20. The head of claim 19 wherein a plurality of read patterns and thus read heads are juxtaposed to define a multihead read assembly, said current access circuits extending through all the juxtaposed patterns to simultaneously propagate those bubbles therein which are displaced by the reversed state of magnetization.

21. A bubble write/read head for use in association with a magnetic medium comprising the combination of;
   first bubble platelet means for generating expanded bubbles of size sufficient to apply a write magnetic field of the medium in the form of a reversed state of magnetization, wherein the presence and absence of expanded bubbles defines an image of the information being recorded as the magnetic history in the medium; and
   second bubble platelet means for generating bubbles therein, and including restraining means for displacing the position of selected bubbles in accordance with the reversed states of magnetization previously recorded, to provide regeneration, detection and thus readout of the image of the information in the medium.

22. The write/read head of claim 21 wherein the first bubble platelet includes means for generating a write bias field which in combination with the stray field of the expanded bubbles generates the reversed state of magnetization in the magnetic medium to define a first binary bit; wherein the absence of an expanded bubble leaves undisturbed the initial state of magnetization of the medium to define the second binary bit.

23. The write/read head of claim 22 wherein the restraining means displaces a generated bubble therein only in response to passage thereby of a reversed state of magnetization in the magnetic medium immediately upon previous recording via the first bubble platelet means.

24. The write/read head of claim 23 further including expander means integral with the first platelet in the form of a trough defining a write head for selectively receiving a bubble, said means for generating a write bias field being disposed to decrease the magnetic field seen by the bubble within the trough to provide expansion of the bubble to a size to provide the reversed state of magnetization over an area of the magnetic medium in register with the trough.

25. The write/read head of claim 24 wherein the restraining means includes;
   a read overlay pattern integral with the second bubble platelet to define a read head in-line with the trough of the write head;
   wherein the bubble is generated within the read overlay pattern; and
   wherein the passage of the reversed state of magnetization adjacent the read overlay pattern induces magnetic poles therein to displace the bubble therefrom for subsequent detection.

26. A process for magnetically writing information with a bubble head in association with a magnetic medium, comprising the steps of;
   applying a normal bias field to the head to allow it to stably support the generation and storage of stable magnetic bubbles adjacent the medium
   generating the stable magnetic bubbles in selected regions of the head to represent a first binary bit of the information;
   wherein failing to generate magnetic bubbles in other selected regions of the head represents the second binary bit of the information, and
   expanding the generated bubbles to a selected size and geometry to apply a magnetic write field to corresponding portions of the medium of sufficient magnitude to write the first binary bit on the medium.

27. The process of claim 26 wherein the step of expanding the bubbles further includes;
   biasing the medium to a point just below the knee of the saturation magnetization curve; and
   applying a bubble expander field in a direction opposed to the normal bias field to allow the bubbles to expand in size, whereby the write bias field in conjunction with the stray field from the expanded bubble provides the composite write field which reverses the state of the magnetization in the medium over the region in register with the expanded bubble; and
   anihilating the expanded bubbles after the write process.

28. The process of claim 27 wherein the step of biasing the medium includes;
   applying a write bias field in the plane of the medium opposite to the magnetization during the write process;
   and the step of applying a bubble expander field includes;
   applying current to a conductor bounding the bubbles to generate a field which opposes the normal bias field during the write process.

29. A process for reading the magnetic history in a magnetic medium with a bubble head, comprising the steps of;
   selectively generating stable magnetic bubbles within the bubble head and adjacent the medium, which bubbles have stray fields insufficient to affect the magnetic history;
   selectively restraining and displacing the bubbles in response to the magnetic history to generate an image thereof within the bubble head; and
   detecting the displaced bubbles to reconstruct the image of the magnetic history.

30. The process of claim 29 wherein the step of selectively generating further includes;
   applying a normal bias field to the head to provide the stable magnetic bubbles;
   wherein the step of selectively restraining and displacing the bubbles includes;
   restraining the bubbles within selected regions of the head in register with respective magnetic history in the medium; and
   releasing those bubbles which are affected by given portions of the magnetic history to allow their subsequent detection.

31. The process of claim 30 wherein the step of detecting further includes;
   propagating the released bubbles to respective regions of detection; and
   expanding the propagated bubbles to allow their ready detection.

32. A bubble head for processing information in association with a magnetic recording medium comprising the combination of;
   means for introducing the information to be recorded to the head in bit parallel, word serial format; and
   bubble logic means for selectively accumulating the bits to allow the serial introduction thereof from the head, to record the words in side-by-side relation across the width of the magnetic medium such that similar bits of each of the words form respective transverse lines across the medium.

* * * * *